US006765309B2

(12) United States Patent
Tallal, Jr. et al.

(10) Patent No.: US 6,765,309 B2
(45) Date of Patent: Jul. 20, 2004

(54) SYSTEM AND BUILDING FOR GENERATING ELECTRICITY USING WIND POWER

(76) Inventors: Joseph J. Tallal, Jr., 6 Collingway Pl., Dallas, TX (US) 75230; Daniel J. Chalker, 3224 Jubilee Trail, Dallas, TX (US) 75229; Sanford E. Warren, Jr., 909 Carriage Way, Southlake, TX (US) 76092; Edwin S. Flores, 3305 Townsend, Dallas, TX (US) 75229

( * ) Notice: Subject to any disclaimer, the term of this patent is extended or adjusted under 35 U.S.C. 154(b) by 56 days.

(21) Appl. No.: 10/027,987

(22) Filed: Dec. 19, 2001

(65) Prior Publication Data

US 2003/0111843 A1 Jun. 19, 2003

(51) Int. Cl.$^7$ ............................... F03D 9/00; H02P 9/04
(52) U.S. Cl. ........................................... 290/55; 290/44
(58) Field of Search .............................. 290/55, 44, 43, 290/54; 454/186

(56) References Cited

U.S. PATENT DOCUMENTS

| | | | | |
|---|---|---|---|---|
| 4,012,163 A | * | 3/1977 | Baumgartner et al. ... | 415/208.3 |
| 4,057,270 A | * | 11/1977 | Lebost .................... | 290/54 |
| 4,242,628 A | * | 12/1980 | Mohan et al. ............. | 322/35 |
| 4,379,972 A | * | 4/1983 | Sosa et al. ............... | 290/44 |
| 4,421,967 A | * | 12/1983 | Birgel et al. ............. | 219/631 |
| 4,651,805 A | * | 3/1987 | Bergeron, Jr. ............ | 165/45 |
| 5,381,048 A | * | 1/1995 | Baird ...................... | 290/55 |
| 5,394,016 A | * | 2/1995 | Hickey ..................... | 290/55 |
| 6,043,565 A | * | 3/2000 | Les Strange ............. | 290/55 |
| 6,097,104 A | * | 8/2000 | Russell .................... | 290/54 |
| 6,191,496 B1 | * | 2/2001 | Elder ....................... | 290/55 |
| 6,319,115 B1 | * | 11/2001 | Shingaki .................. | 454/186 |
| 6,437,457 B2 | * | 8/2002 | Roskey ..................... | 290/55 |

* cited by examiner

Primary Examiner—Tran Nguyen
Assistant Examiner—Julio Gonzalez
(74) Attorney, Agent, or Firm—Daniel Chalker; Chalker Flores, LLP

(57) ABSTRACT

The present invention provides a system and building for generating electricity using wind power. The invention includes an enclosure, a wind turbine/generator and two or more air ducts. The enclosure, which is to be mounted within or in close proximity to a building, has an air intake and an air exhaust has an air intake and an air exhaust. The wind turbine/generator generates electricity from the wind received form the air intake and is disposed within the enclosure between the air intake and the air exhaust. Each air duct has a first end connected to an air duct intake device and second end connected to the enclosure air intake.

58 Claims, 3 Drawing Sheets

SYSTEM AND BUILDING FOR GENERATING ELECTRICITY USING WIND POWER

TECHNICAL FIELD OF THE INVENTION

The present invention relates in general to the field of energy conservation and electricity production in and around buildings for use in residential, commercial and other area, and more particularly, to a system and building that use the wind in and about a structure to generate electricity.

BACKGROUND OF THE INVENTION

Without limiting the scope of the invention, its background is described in connection with wind-power generating structures, as an example. During the past decade the need for alternative energy generation has increased in dramatic fashion. With the increase in foreign oil dependency, uncertain oil prices, environmental concerns and the lack of sufficient energy supplies as seen recently in California, for example, there is an unmet demand for cost-effective alternative energy supplies. One such alternative energy supply is the use of wind-powered generators to augment other more conventional sources of electricity for both residential and commercial use.

Heretofore, in this field, structures that have wind-powered generators have not been constructed as an integral part of the structure. Examples of prior wind-power generating structures include windmills and similar structures, which are not aesthetically pleasing and are prohibited under building codes in most urban areas. One of the main problems with existing buildings that incorporate wind-powered devices is that they fail to maximum the use of windflow or airflow volume as enhanced by the interior and exterior of the building itself. More particularly, buildings merely use the building structure to vector and channel windflow or airflow volume from only an external wind input to a more concentrated windflow or airflow. Thus, buildings are not designed to vector airflow from both internal and external sources into one area of the building or structure. Only external airflow is used and augmented by vectoring using relatively narrowed corridors that form part of the building or wind vanes that are attached there to. These structures only concentrate external airflow that may be harnessed by a wind-powered generator.

In addition, most buildings are designed and built without any provision for generating electricity from the wind. As a result, most building owners do not consider adapting their building to generate electricity from the wind because wind-powered systems are expensive, unaesthetic and/or require extensive modifications to the building.

Accordingly, there is a need for a system and building that incorporates and integrates the entire building to generate electricity. In addition, there is a need for a system that can be integrated into an existing building that was not previously designed to generate electricity from the wind.

SUMMARY OF THE INVENTION

The present invention provides a system and building for generating electricity using wind power. The present invention incorporates and integrates the entire building to generate electricity. In addition, the present invention provides a system that can be integrated into an existing building that was not previously designed to generate electricity from the wind. As a result, virtually any building can be retrofit to generate electricity at a reasonable cost and without extensive modifications to the building. The present invention can be easily incorporated into new building designs or added to existing building without significantly altering the aesthetics of the building. The present invention makes wind-power a viable addition to residential and commercial buildings.

In one embodiment, the present invention provides a system for generating electricity from a wind that includes an enclosure, a wind turbine/generator and two or more air ducts. The enclosure, which is to be mounted within or in close proximity to a building, has an air intake and an air exhaust. The wind turbine/generator generates electricity from the wind received from the air intake and is disposed within the enclosure between the air intake and the air exhaust. Each air duct has a first end connected to an air duct intake device and a second end connected to the enclosure air intake.

In another embodiment, the present invention provides a building adapted to generate electricity from a wind having an enclosure, a wind turbine/generator and two or more air ducts. The enclosure is disposed within or in close proximity to the building and has an air intake and an air exhaust. The wind turbine/generator generates electricity from the wind and is disposed within the enclosed space between the air intake and the air exhaust. Each of the two or more air ducts has a first end connected to an air duct intake device mounted on an exterior of the building and a second end connected to the enclosure air intake. Using both internal and external intakes, both the structure and internal convection current are used to increase the airflow and consequently the power generated by the wind turbine/generator.

In yet another embodiment, the first end of the two or more ducts has a larger cross sectional area than the second end of the two or more ducts. The invention may also use an intermediate duct disposed between the enclosure air intake and the second ends of the two or more ducts. To protect the components of the system and maximize airflow, the air duct intake device may include a grill mounted on an exterior of a building to prevent the entry of rodents and other unwanted intruders. Externally, the air duct intake device may include an air scoop, with one embodiment using a directional inlet that changes position in favor of the wind direction, which may even be controlled remotely.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

The present invention provides a system and building for generating electricity using wind power. The present invention incorporates and integrates the entire building to generate electricity. In addition, the present invention provides a system that can be integrated into an existing building that was not previously designed to generate electricity from the wind. As a result, virtually any building can be retrofit to generate electricity at a reasonable cost and without extensive modifications to the building. The present invention can be easily incorporated into new building designs or added to existing building without significantly altering the aesthetics of the building. The present invention makes wind-power a viable addition to residential and commercial buildings.

Figure 1:
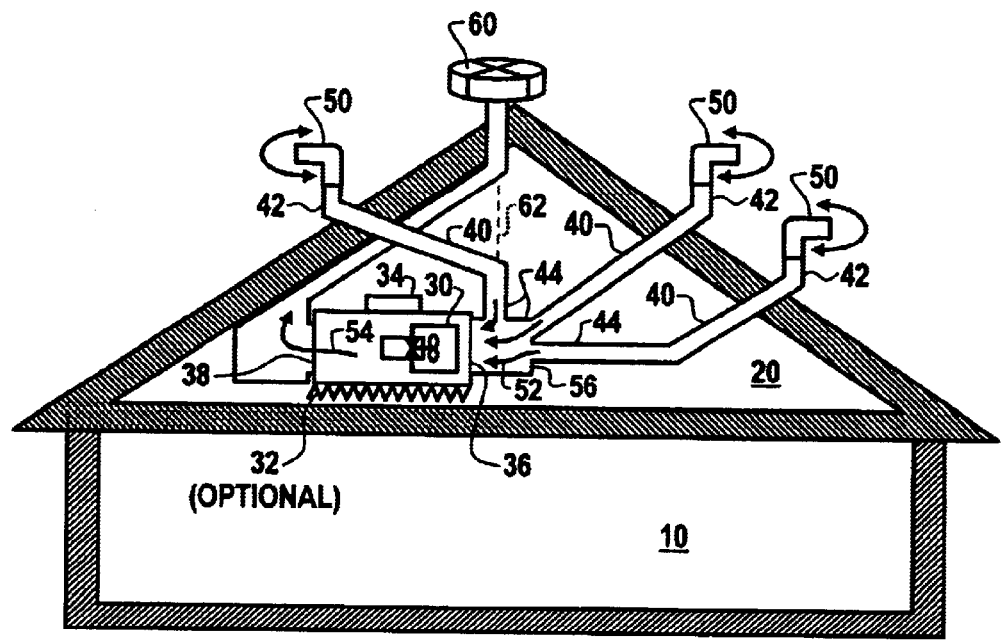
FIG. 1 discloses one embodiment of the present invention that shows a structure or building illustrating the use of both external and internal airflow.

Turning now to FIG. 1, one embodiment of the present invention is disclosed that shows a structure or building 10 illustrating the use of both external and internal airflow. The structure or building 10 may be either a residential or a commercial building well known to those of ordinary skill in the art in the construction and real estate industry. The building 10 may be manufactured of any conventional building material such as wood, brick, concrete or metal. Located within the building 10 is an enclosed space or enclosure 20. The enclosure 20 may be a typical attic of a residential building 10 or of any open area within a commercial building 10. The enclosure 20 may also be a smaller enclosed space within the attic of the residential building 10 or open area within a commercial building 10. The enclosure may include sound insulation. Enclosed within the enclosure 20 is a wind turbine/generator 30 of any commercially available type that is of suitable size and strength for use with the present invention. Wind turbines of this type are well known to those of ordinary skill in the art and may also be referred to as wind generators or wind turbine/generators. The wind turbine/generator 30 of the present invention may also be located and mounted in either a horizontal (FIG. 1) or vertical manner (FIG. 2) and may be constructed of noise dampening and vibration dampening materials in order to reduce the amount of noise and vibration created by the generation of electricity from the wind turbine/generator 30. Alternatively, the wind turbine/generator 30 can be mounted on a vibration dampener 32.

The present invention may also include a processor or controller 34, such as a computer or programmed logic control, for monitoring and controlling the wind turbine/generator 30 and directional inlets of the air intake opening scoops 50 (described below). The wind turbine/generator 30 and directional inlets of the air intake opening scoops 50 (described below) may also be controlled by a building central computer or processing unit that regulates the generation of electricity based upon the needs of the building 10 itself. The wind turbine/generator 30 of the present invention will be connected in a conventional manner to the powers supply of the building 10. The wind turbine/generator 30 may also be connected to the power supply of the building 10 in such a way that allows excess power to be sold back to utility company when the power generated by the wind turbine/generator 30 exceeds the power requirements of the building 10 (e.g., windy nights).

Connected to the wind turbine/generator 30 of the present invention, in one embodiment, are two or more air ducts 40 having both first and second ends 42 and 44, respectively. The air ducts 40 have air intake openings 50, which are positioned in a non-axial relationship to the wind turbine/generator 30 and are attached at one end of the air ducts 40, the air intake openings 50 funnel the air through the air ducts 40 until it (air flow 52) reaches a focusing device 56 at the air intake 36 of the wind turbine/generator 30 for generating electricity. In at least one embodiment, the air intake openings 50 are of a scoop-type construction, which allows more air to the air ducts 40 that is found in a normal circular or other type of opening disposed on the outside of the air ducts 40 of the building 10. In one embodiment, the air intake opening scoops 50 have directional inlets that change the direction the scoop 50 points to align itself with the direction the wind is blowing. Although, the air intake scoops 50 can be placed anywhere on the building 10, the air intake scoops can be strategically located on the building 10 to take advantage of higher airflows on and around the building 10 that are caused by the building 10 itself, such as roof ridge tops and intersections, along building lines and under roof eves at the top of an exterior wall. Moreover, small ridges or other wind breaks can be used to funnel and force wind into the scoops 50. These wind breaks or channeling means can be incorporated into the design of the building 10 to minimize any undesirable aesthetic effect.

Figure 2:
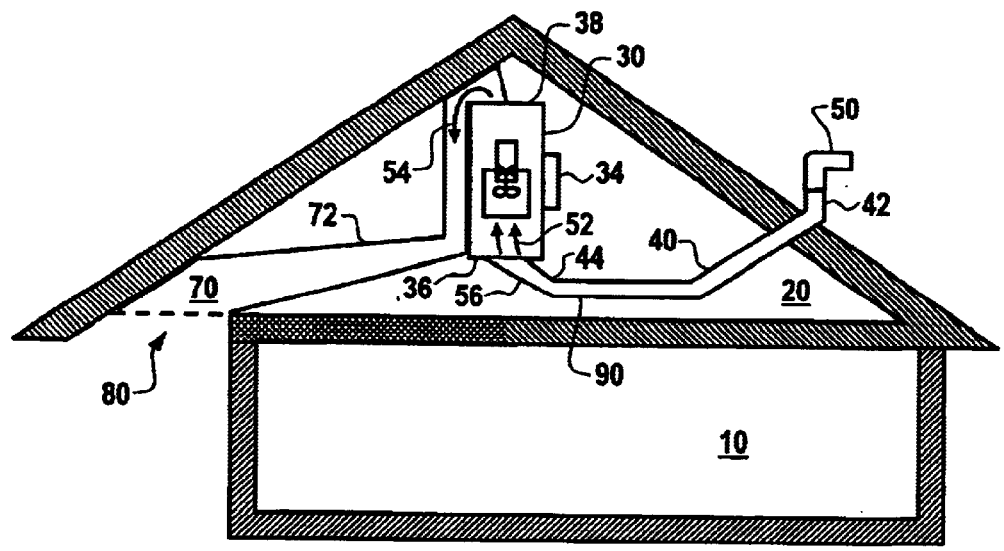
FIG. 2 discloses one embodiment of the present invention that shows another structure or building illustrating the use of both external and internal airflow.

In at least one embodiment of the present invention as shown in FIG. 2, other air ducts 40 have a greater cross-sectional diameter near the air intake openings 50 that decreases gradually along its length. This change in cross-sectional diameter allows for a Venturi effect thereby increasing the velocity of the air that enters through the air intake opening 50 before it teaches the wind turbine/generator 30. Having a greater airflow, this design, creates more electricity to be generated by the wind turbine/generator 30. Similarly, additional airflow can be obtained by joining additional air ducts (not shown) having a smaller diameter than the main air ducts 40 to the main air duct 40 at an acute angle, such as thirty degrees, to create a vacuum effect in the smaller air duct.

As the air passes through the wind turbine/generator 30 it generates electricity, which is then connected in any conventional manner to the building's 10 normal utilities (not shown). Any excess electricity may be stored in batteries or other storage devices or later use. In one embodiment, the wind turbine/generator 30 may generate sufficient electricity to supply all of the power requirements of the building 10. In an alternative method the excess electricity generated by the wind turbine/generator 30 from the airflow may be sold back to a public utility in order to reduce the at of the energy supply for the building 10.

Also shown in FIG. 1 is that the building 10 has typical exhaust vent 60 for the airflow 54 to exit the air exhaust 38 of the wind turbine/generator 30. The excess airflow exits the enclosure 20 of the building 10 after having gone through the wind turbine/generator 30. In one embodiment, some or all of the airflow from exhaust vent 60 may be redirected back into one of the air ducts 40 to provide additional airflow as shown by dashed line 62. Additional sources of airflow may also be obtained from vent pipes by directing the exhaust from dryers and air conditioning units into the enclosure 20. In addition, the warm or hot air in the top of an attic can be collected and directed into the enclosure 20.

Turning now to FIG. 2, a second embodiment of the present invention is shown. In this embodiment the wind turbine/generator 30 is also located within the space 20 which maybe an attic of the building 10. FIG. 2 also discloses an air intake opening 50 located on the air duct 40 that funnels the wind through the wind turbine/generator 30 to to generate the electricity for the building 10. After the wind has gone through the wind generator, it is exhausted through an opening 70 via duct 72. In this embodiment, opening 70 is covered by a grill 80. The grill 80 may be mounted to the exterior of the building 10 and for example, could be located along the eaves of a typical residential structure or commercial building 10. The grill 80 may be of any type shape, geometry or material as long as it is capable of allowing the exhaust air leave the building 10.

In addition, air ducts 40 may have an angled slope 90 which helps to increase the velocity of the air flow coming in through the air intake opening 30 before it hits the wind turbine/generator 30. The angled slope 90 increases velocity of the air and thus aids in the generation of electricity.

Figure 3:
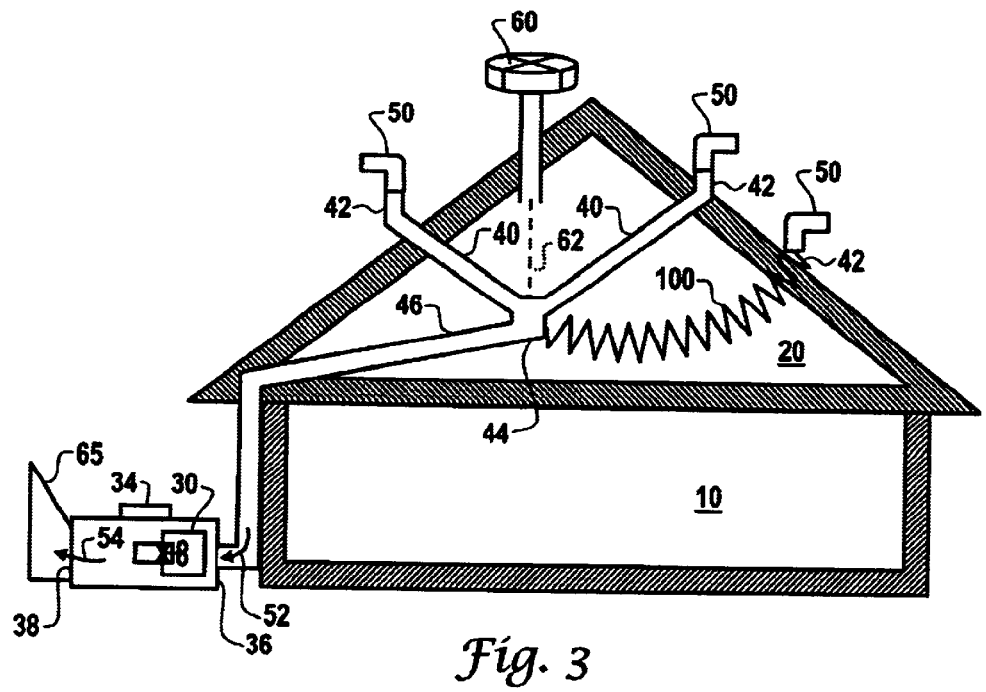
FIG. 3 discloses one embodiment of the present invention that shows another structure or building illustrating the use of both external and internal airflow.

Turning to FIG. 3, in yet another embodiment of the present invention, a plurality of air ducts 40 are connected to the structure or building 10 and the enclosure 20. The air ducts 40 way be manufactured with either rigid or of a flexible material 100. In addition, the enclosure 20 and the wind turbine/generator 30 may be located on the exterior of or in close proximity to the building 10 instead of being disposed within the building 10. FIG. 3 also illustrates both a typical air exhaust opening 60 and outside air exhaust duct 65. In addition, FIG. 3 demonstrates that the airflow to the wind turbine/generator 30 may be delivered in a variety of way as long as there is sufficient velocity to generate electricity from the wind turbine/generator 30 (multiple ducts 40 feeding into intermediate duct 46).

Figure 4:
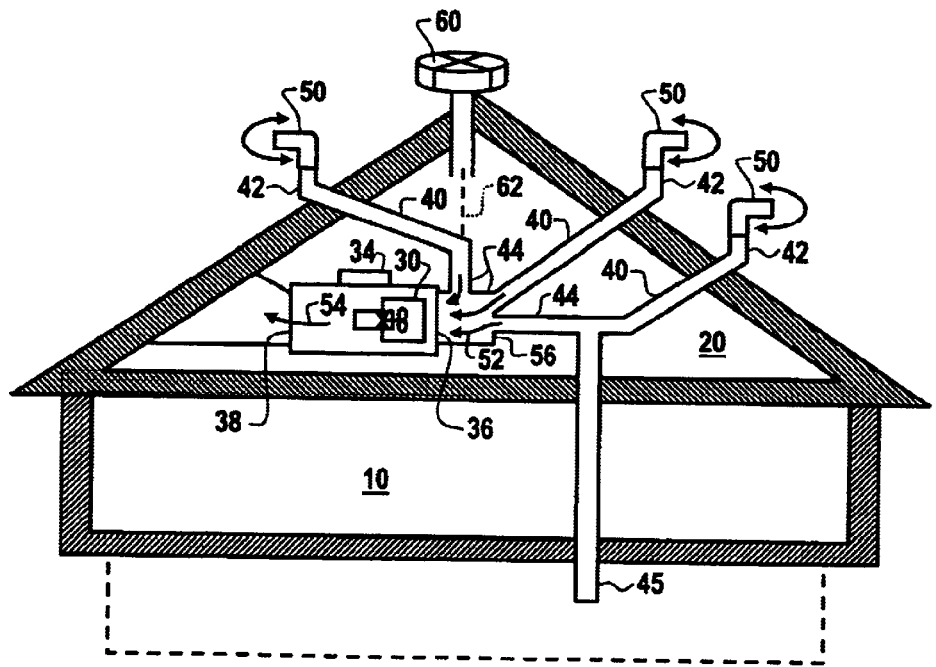
FIG. 4 discloses one embodiment of the present invention that shows another structure or building illustrating the use of both external and internal airflow.

FIG. 4 discloses yet another embodiment of e invention, wherein the air ducts 40 may be located either under a structure or building 10 having a pier and beam foundation or within a basement of a building 10, such that air flow may also be obtained from the basement area or may deliver air to the basement area in order to achieve more air velocity through the wind turbine/generator 30. The air duct 45 is connected to the air ducts 40 might be used to create a partial pressure differential in the air how and, thus, increase the velocity of the air across the wind turbine/generator 30.

Figure 5:
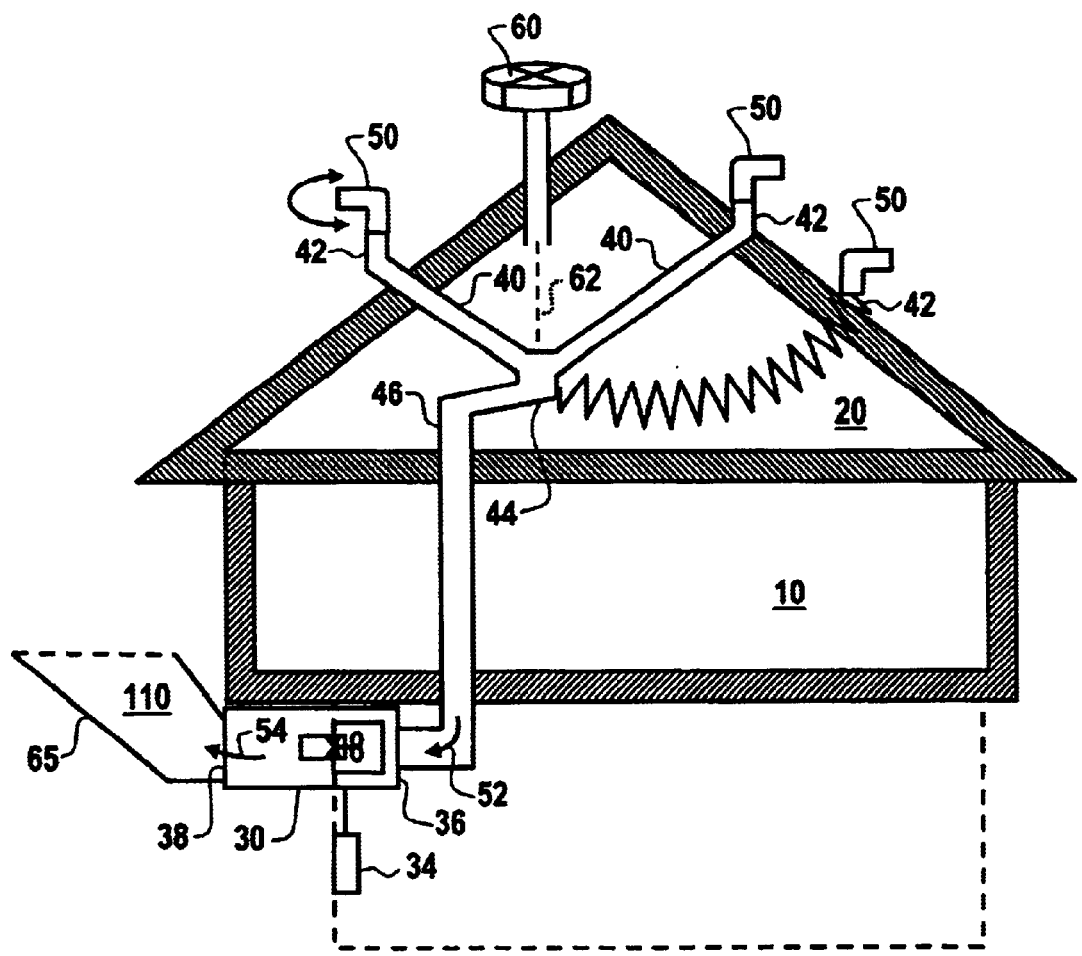
FIG. 5 discloses one embodiment of the present invention that shows another structure or building illustrating the use of both external and internal airflow.

Turning to FIG. 5, disclosed therein is that the wind turbine/generator 30 may also be located in a basement area of the building 10 with the exhaust 54 going through exhaust duct 65 and grill 110 from the ground itself or through a grate next to the building 10. As shown, there are numerous configurations of the present invention that may be combined without any necessity to use all or any particular configuration to achieve the results of the invention. The varying cross-sectional air ducts 40 may be combined with the air intake scoops 50 or flexible air ducts 100 or not. The wind turbine/generator 30 may be mounted either on the outside of the building 10; the base of the building 10 or in the enclosure 20. Indeed, a plurality of wind turbine/generator 30 maybe used in series to generate electricity if the building 10 is large enough to warrant more than one wind turbine/generator. An outside air exhaust 60 or 110 may be used. The configurations are limitless as long as sufficient wind velocity is achieved to generate sufficient cost-effective electricity for the building 10.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for generating electricity from a wind comprising:
   a wind turbine/generator disposed within or in close proximity to a building, the wind turbine/generator having an air intake and an air exhaust, whereby the wind turbine/generator generates electricity from the wind received from the air intake;
   two or more air ducts within an enclosure of the building, each air duct having a first end connected to an air duct intake device mounted on the building in a non-axial relationship to the wind turbine/generator and a second end connected to the wind turbine/generator air intake, the air ducts funneling the wind to the air intake of the wind turbine/generator; and
   an air flow focusing device disposed within the enclosure between the air ducts and the air intake of the wind turbine/generator.

2. The system as recited in claim 1 wherein the first end of the two or more ducts has a larger cross sectional area than the second end of the two or more ducts.

3. The system as recited in claim 1 further comprising an intermediate duct disposed between the wind turbine/generator air intake and the second ends of the two or more ducts.

4. The system as recited in claim 1 wherein the air duct intake device is a grill mounted on an exterior of the building.

5. The system as recited in claim 1 wherein the air duct intake device is an air scoop.

6. The system as recited in claim 5 wherein the air scoop has a directional inlet that changes position in favor of the wind direction.

7. The system as recited in claim 5 wherein the directional inlet is remotely controlled.

8. The system as recited in claim 1 wherein the wind turbine/generator is mounted within an attic of the building.

9. The system as recited in claim 1 wherein the wind turbine/generator is mounted within a basement of the building.

10. The system as recited in claim 1 wherein the wind turbine/generator is mounted outside the building and the two or more ducts are substantially disposed within the building.

11. The system as recited in claim 1 wherein the wind turbine/generator is mounted on a vibration dampener within the enclosure.

12. The system as recited in claim 1 wherein the enclosure is insulated for sound.

13. The system as recited in claim 1 further comprising a processor for monitoring and controlling the wind turbine/generator.

14. The system as recited in claim 1 further comprising an exhaust duct having a first end connected to the wind turbine/generator air exhaust and a second end connected to an air exhaust vent.

15. The system as recited in claim 14 wherein the air duct exhaust vent is a grill mounted on an exterior of the building.

16. A building adapted to generate electricity from a wind comprising:
   a wind turbine/generator disposed within or in close proximity to the building, the wind turbine/generator having an air intake and an air exhaust, whereby the wind turbine/generator generates electricity from the wind received from the air intake;

two or more air ducts within an enclosure of the building, each air duct having a first end connected to an air duct intake device mounted on an exterior of the building in a non-axial relationship to the wind turbine/generator and a second end connected to the wind turbine/generator air intake, the air ducts funneling the wind to the air intake of the wind turbine/generator; and an air flow focusing device disposed within the enclosure between the air ducts and the air intake of the wind turbine/generator.

17. The building as recited in claim 16 wherein the first end of the two or more ducts has a larger cross sectional area than the second end of the two or more ducts.

18. The building as recited in claim 16 further comprising an intermediate duct disposed between the wind turbine/generator air intake and the second ends of the two or more ducts.

19. The building as recited in claim 16 wherein the air duct intake device is a grill.

20. The building as recited in claim 16 wherein the air duct intake device is an air scoop.

21. The building as recited in claim 20 wherein the air scoop has a directional inlet that changes position in favor of the wind direction.

22. The building as recited in claim 20 wherein the directional inlet is remotely controlled.

23. The building as recited in claim 16 wherein the wind turbine/generator is mounted within an attic of the building.

24. The building as recited in claim 16 wherein the wind turbine/generator is mounted within the basement of the building.

25. The building as recited in claim 16 wherein the wind turbine/generator is mounted on a vibration dampener within the enclosure.

26. The building as recited in claim 16 wherein the enclosure is insulated for sound.

27. The building as recited in claim 16 further comprising a processor for monitoring and controlling the wind turbine/generator.

28. The building as recited in claim 16 further comprising an exhaust duct having a first end connected to the wind turbine/generator air exhaust and a second end connected to an air exhaust vent mounted on the exterior of the building.

29. The building as recited in claim 16 wherein the air duct exhaust vent is a grill.

30. A system for generating electricity from a wind comprising:

a wind turbine/generator disposed within or in close proximity to a building, the wind turbine/generator having an air intake and an air exhaust, whereby the wind turbine/generator generates electricity from the wind received from the air intake;

two or more air ducts within an enclosure of the building, each air duct having a first end connected to an air duct intake device mounted on the building in a non-axial relationship to the wind turbine/generator and a second end connected to the wind turbine/generator air intake, the air ducts funneling the wind to the air intake of the wind turbine/generator; and the wind turbine/generator air exhaust having a cross sectional area that is substantially larger than the cross sectional area of the two or more air ducts.

31. The system as recited in claim 30 wherein the first end of the two or more ducts has a larger cross sectional area than the second end of the two or more ducts.

32. The system as recited in claim 30 further comprising an intermediate duct disposed between the wind turbine/generator air intake and the second ends of the two or more ducts.

33. The system as recited in claim 30 wherein the air duct intake device is a grill mounted on an exterior of the building.

34. The system as recited in claim 30 wherein the air duct intake device is an air scoop.

35. The system us recited in claim 34 wherein the air scoop has a directional inlet that changes position in favor of the wind direction.

36. The system as recited in claim 34 wherein the directional inlet is remotely controlled.

37. The system as recited in claim 30 wherein the wind turbine/generator is mounted within an attic of the building.

38. The system as recited in claim 30 wherein the wind turbine/generator is mounted within a basement of the building.

39. The system as recited in claim 30 wherein the wind turbine/generator is mounted outside the building and the two or more ducts are substantially disposed within the building.

40. The system as recited an claim 30 wherein she wind turbine/generator is mounted on a vibration dampener within the enclosure.

41. The system as recited in claim 30 wherein the enclosure is insulated for sound.

42. The system as recited in claim 30 further comprising a processor for monitoring and controlling the wind turbine/generator.

43. The system as recited in claim 30 further comprising an exhaust duct having a first end connected to the wind turbine/generator air exhaust and a second end connected to an air exhaust vent.

44. The system as recited in claim 43 wherein the air duct exhaust vent is a grill mounted on an exterior of the building.

45. A building that generates electricity from a wind comprising:

a wind turbine/generator disposed within or in close proximity to the building, the wind turbine/generator having an air intake and an air exhaust, whereby the wind turbine/generator generates electricity from the wind received from the air intake;

two or more air ducts within an enclosure of the building, each air duct having a first end connected to an air duct intake device mounted on an exterior or the building in a non-axial relationship to the wind turbine/generator and a second end connected to the wind turbine/generator air intake, the air ducts funneling the wind to the air intake of the wind turbine/generator; and the wind turbine/generator air exhaust having a cross sectional area that is substantially larger than the cross sectional area of the two or more air ducts.

46. The building as recited in claim 45 wherein the first end of the two or more ducts has a larger cross sectional area than the second end of the two or more ducts.

47. The building as recited in claim 45 further comprising an intermediate duct disposed between the wind turbine/generator air intake and the second ends of the two or more ducts.

48. The building as recited in claim 45 wherein the air duct intake device is a grill.

49. The building as recited in claim 45 wherein the air duct intake device is an air scoop.

50. The building as recited in claim 49 wherein the air scoop has a directional inlet that changes position in favor of the wind direction.

51. The building as recited in claim 50 wherein the directional inlet is remotely controlled.

52. The building an recited in claim 45 wherein the wind turbine/generator is mounted within an attic of the building.

53. The building as recited in claim 45 wherein the wind turbine/generator is mounted within the basement of the building.

54. The building as recited in claim 45 wherein the wind turbine/generator is mounted on a vibration dampener within the enclosure.

55. The building as recited in claim 45 wherein the enclosure is insulated for sound.

56. The building as recited in claim 45 further comprising a processor for monitoring and controlling the wind turbine/generator.

57. The building as recited in claim 45 further comprising an exhaust duct having a first end connected to the wind turbine/generator air exhaust and a second end connected to an air exhaust vent mounted on the exterior of the building.

58. The building as recited in claim 45 wherein the air duct exhaust vent is a grill.

* * * * *